US012583459B1

(12) United States Patent     (10) Patent No.:   US 12,583,459 B1

Watts et al.     (45) Date of Patent:    Mar. 24, 2026

(54) METHOD TO AUTOMATICALLY ROCK FREE A STUCK VEHICLE

(71) Applicant: GM Global Technology Operations LLC, Detroit, MI (US)

(72) Inventors: Matthew Watts, South Lyon, MI (US); Devon Robert Hall, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/087,973

(22) Filed: Mar. 24, 2025

(51) Int. Cl.
*B60W 30/18*     (2012.01)
*B60W 10/06*     (2006.01)
*B60W 10/10*     (2012.01)
*B60W 30/02*     (2012.01)

(52) U.S. Cl.
CPC ...... *B60W 30/18172* (2013.01); *B60W 10/06* (2013.01); *B60W 10/10* (2013.01); *B60W 30/02* (2013.01); *B60W 2520/10* (2013.01); *B60W 2520/26* (2013.01); *B60W 2520/30* (2013.01)

(58) Field of Classification Search
CPC .......... B60W 30/18172; B60W 10/06; B60W 10/10; B60W 30/02; B60W 2520/10; B60W 2520/26; B60W 2520/30
See application file for complete search history.

(56) References Cited

U.S. PATENT DOCUMENTS

| | | | |
|---|---|---|---|
| 7,571,044 B2 | 8/2009 | Brown et al. | |
| 2015/0291170 A1* | 10/2015 | Mair | B60W 30/18045 |
| | | | 701/1 |
| 2018/0111625 A1* | 4/2018 | James | B60W 30/18009 |
| 2018/0345924 A1* | 12/2018 | Berels | B60T 8/175 |
| 2019/0113924 A1* | 4/2019 | Falconer | B60W 30/18172 |
| 2025/0256586 A1* | 8/2025 | Brookshire | B60L 3/08 |

FOREIGN PATENT DOCUMENTS

DE     102004017422 A1    10/2005

OTHER PUBLICATIONS

German Office Action for German Application No. 102025117108. 4; dated Dec. 17, 2025; 9 pages.

* cited by examiner

*Primary Examiner* — Tisha D Lewis

(74) *Attorney, Agent, or Firm* — CANTOR COLBURN LLP

(57) ABSTRACT

A vehicle includes a method for operation. The vehicle includes a wheel, an actuator for controlling rotation of the wheel, a sensor for detecting a stuck condition for the wheel, and a processor for performing an automated rocking mode at the vehicle. The automated rocking mode includes engaging an engine of the vehicle into a first gear, rotating the wheel via the actuator with the engine in the first gear to create a first motion of the vehicle in a first direction, obtaining a traction indicator of the vehicle with the engine in the first gear, engaging the engine into a second gear when the traction indicator meets a traction threshold, and rotating the wheel via the actuator with the engine in the second gear to create a second motion of the vehicle in a second direction.

20 Claims, 6 Drawing Sheets

METHOD TO AUTOMATICALLY ROCK FREE A STUCK VEHICLE

INTRODUCTION

The subject disclosure relates to operation of a vehicle and, in particular, to a method for freeing the vehicle, or a wheel of the vehicle, from a ditch by automatically rocking the vehicle within the ditch.

In various off-road operations, a wheel can find itself stuck in a ditch. Typically, a wheel of the vehicle is stuck in the ditch, with other wheels of the vehicle having traction with a surface. Unfortunately, this traction is sometime not enough to pull the stuck wheel out of the ditch through straightforward acceleration of the vehicle. Manually applied techniques for getting out of the ditch can require the help of others or a proficiency on the part of the driver. Accordingly, it is desirable to provide an automated method than can be applied at the vehicle to get stuck vehicles out of a ditch.

SUMMARY

In one exemplary embodiment, a method of operating a vehicle is disclosed. The method includes detecting the vehicle to have a wheel stuck in a ditch and performing an automated rocking mode at the vehicle. The automated rocking mode includes engaging, via a processor, an engine of the vehicle into a first gear, rotating the wheel with the engine in the first gear to create a first motion of the vehicle in a first direction, obtaining a traction indicator of the vehicle with the engine in the first gear, engaging, via the processor, the engine into a second gear when the traction indicator meets a traction threshold, and rotating the wheel with the engine in the second gear to create a second motion of the vehicle in a second direction.

In addition to one or more of the features described herein, the method further includes obtaining the traction indicator with the engine in the second gear and engaging the engine into the first gear to rotate the wheel in the first direction when the traction indicator meets the traction threshold.

In addition to one or more of the features described herein, obtaining the traction indicator further includes measuring a wheel slip of the wheel, a torque at the wheel and an acceleration of the vehicle and wherein the traction indicator meets the traction threshold when at least one of the wheel slip is greater than a slip threshold and a ratio of the torque at the wheel to the acceleration of the vehicle is greater than a stall threshold.

In addition to one or more of the features described herein, the method further includes measuring a speed of the vehicle and exiting the automated rocking mode when the speed of the vehicle is greater than a first speed threshold.

In addition to one or more of the features described herein, the method further includes entering the automated rocking mode when at least one of an attempt by a driver to rock the vehicle is detected, a slip is detected at the wheel for a selected duration of time, a value obtained from an image of the wheel indicates the wheel to be stuck, and a request to enter the automated rocking mode is received.

In addition to one or more of the features described herein, the first gear is a drive gear and the second gear is a reverse gear.

In addition to one or more of the features described herein, the method further includes ramping up a throttle of the vehicle to a peak throttle value when the engine is in the first gear based on a current throttle position and a current vehicle motion.

In another exemplary embodiment, a system for operating a vehicle is disclosed. The system includes a sensor for detecting the vehicle to have a wheel stuck in a ditch and a processor for performing an automated rocking mode at the vehicle. The automated rocking mode includes engaging an engine of the vehicle into a first gear, rotating the wheel with the engine in the first gear to create a first motion of the vehicle in a first direction, obtaining a traction indicator of the vehicle with the engine in the first gear, engaging the engine into a second gear when the traction indicator meets a traction threshold, and rotating the wheel with the engine in the second gear to create a second motion of the vehicle in a second direction.

In addition to one or more of the features described herein, the processor is further configured to obtain the traction indicator with the engine in the second gear and engage the engine into the first gear to rotate the wheel in the first direction when the traction indicator meets the traction threshold.

In addition to one or more of the features described herein, the processor is further configured to obtain the traction indicator by measuring a wheel slip of the wheel, a torque at the wheel and an acceleration of the vehicle and wherein the traction indicator meets the traction threshold when at least one of the wheel slip is greater than a slip threshold and a ratio of the torque at the wheel to the acceleration of the vehicle is greater than a stall threshold.

In addition to one or more of the features described herein, the processor is further configured to measure a speed of the vehicle and exit the automated rocking mode when the speed of the vehicle is greater than a first speed threshold.

In addition to one or more of the features described herein, the processor is further configured to enter the automated rocking mode when at least one of an attempt by a driver to rock the vehicle is detected, a slip is detected at the wheel for a selected duration of time, a value obtained from an image of the wheel indicates the wheel to be stuck, and a request to enter the automated rocking mode is received.

In addition to one or more of the features described herein, the first gear is a drive gear and the second gear is a reverse gear.

In addition to one or more of the features described herein, wherein the processor is further configured to ramp up a throttle of the vehicle to a peak throttle value when the engine is in the first gear based on a current throttle position and a current vehicle motion.

In yet another exemplary embodiment, a vehicle is disclosed. The vehicle includes a wheel, an actuator for controlling rotation of the wheel, a sensor for detecting a stuck condition for the wheel, and a processor for performing an automated rocking mode at the vehicle. The automated rocking mode includes engaging an engine of the vehicle into a first gear, rotating the wheel via the actuator with the engine in the first gear to create a first motion of the vehicle in a first direction, obtaining a traction indicator of the vehicle with the engine in the first gear, engaging the engine into a second gear when the traction indicator meets a traction threshold, and rotating the wheel via the actuator with the engine in the second gear to create a second motion of the vehicle in a second direction.

In addition to one or more of the features described herein, the processor is further configured to obtain the traction indicator with the engine in the second gear and engage the engine into the first gear to rotate the wheel in the first direction when the traction indicator meets the traction threshold.

In addition to one or more of the features described herein, the processor is further configured to obtain the traction indicator by measuring a wheel slip of the wheel, a torque at the wheel and an acceleration of the vehicle and wherein the traction indicator meets the traction threshold when at least one of the wheel slip is greater than a slip threshold and a ratio of the torque at the wheel to the acceleration of the vehicle is greater than a stall threshold.

In addition to one or more of the features described herein, the processor is further configured to measure a speed of the vehicle and exit the automated rocking mode when the speed of the vehicle is greater than a first speed threshold.

In addition to one or more of the features described herein, the processor is further configured to enter the automated rocking mode when at least one of an attempt by a driver to rock the vehicle is detected, a slip is detected at the wheel for a selected duration of time, a value obtained from an image of the wheel indicates the wheel to be stuck, and a request to enter the automated rocking mode is received.

In addition to one or more of the features described herein, the processor is further configured to ramp up a throttle of the vehicle to a peak throttle value when the engine is in the first gear based on a current throttle position and a current vehicle motion.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
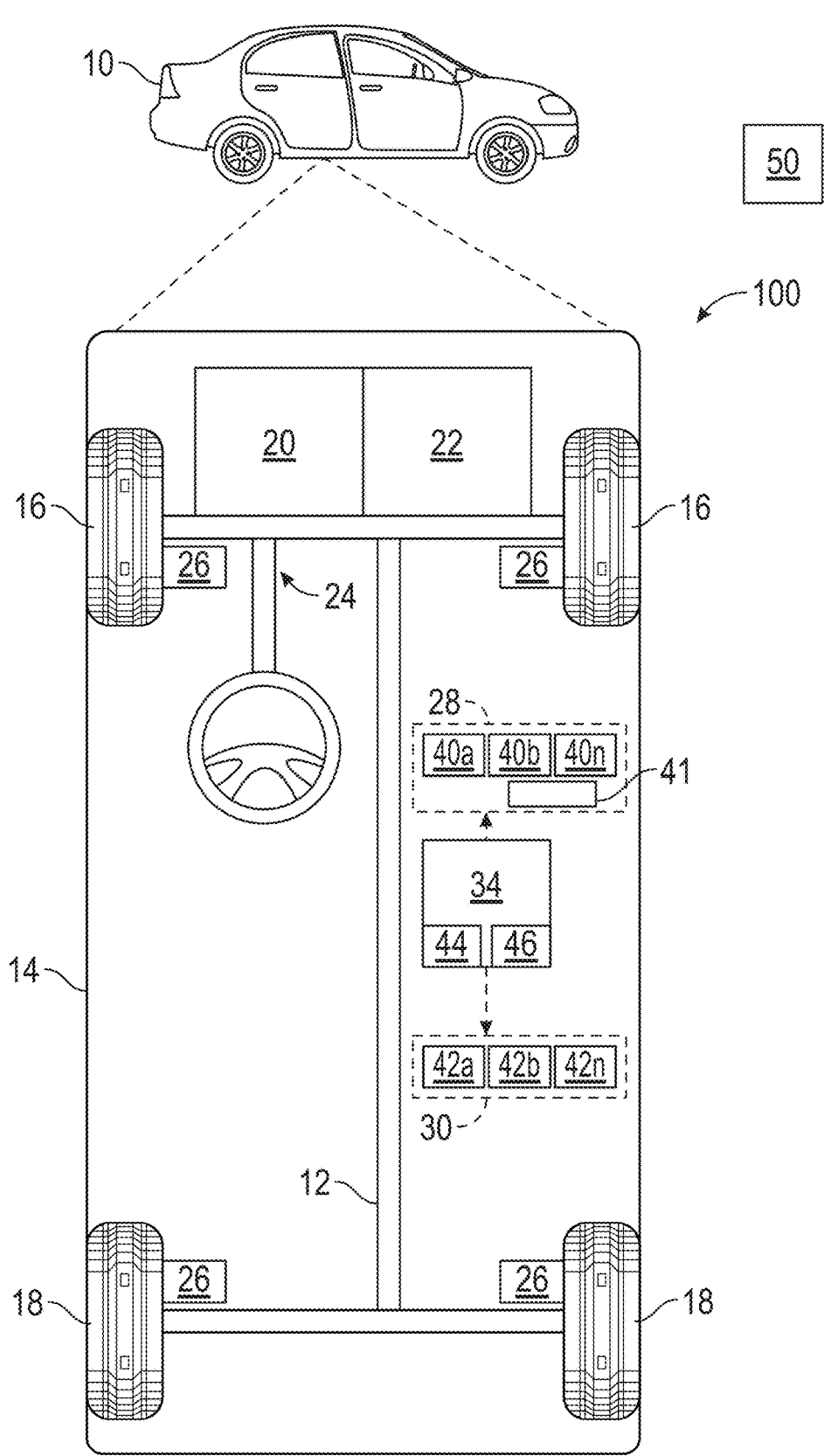
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10. In various embodiments, the vehicle 10 is an autonomous vehicle. The autonomous vehicle can include a trajectory planning system depicted at 100. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near respective corners of the body 14.

In various embodiments, the trajectory planning system 100 is incorporated into the autonomous vehicle. The autonomous vehicle is, for example, a vehicle that is automatically controlled to carry passengers from one location to another. The autonomous vehicle is depicted in the illustrated embodiment as a passenger car, but it should be appreciated that any other vehicle including motorcycles, trucks, sport utility vehicles (SUVs), recreational vehicles (RVs), etc., can also be used. At various levels, an autonomous vehicle can assist the driver through a number of methods, such as warning signals to indicate upcoming risky situations, indicators to augment situational awareness of the driver by predicting movement of other agents warning of potential collisions, etc. The autonomous vehicle has different levels of intervention or control of the vehicle through coupled assistive vehicle control all the way to full control of all vehicle functions. The autonomous vehicle can be any of a Level One through Level Five system. A Level 1 system includes driver assistance and performs a single autonomous task at a time, such as steering or braking. The Level 1 system can include cruise control and lane detection. A Level 2 system includes partial driving automation. Such a vehicle can control both steering and speed, but the driver must be ready to take over in an emergency. A Level 3 system is a conditional driving automation system that includes environmental detection capabilities. Such a vehicle can perform most driving tasks, but a human override is still required. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle generally includes a propulsion system 20, a transmission system 22, a steering system 24, a brake system 26, a sensor system 28, an actuator system 30, and a controller 34. The propulsion system 20 may, in various embodiments, include an internal combustion engine, an electric machine such as a traction motor, and/or a fuel cell propulsion system. The transmission system 22 is configured to transmit power from the propulsion system 20 to the front wheels 16 and rear wheels 18 according to selectable speed ratios. According to various embodiments, the transmission system 22 may include a step-ratio automatic transmission, a continuously variable transmission, or other appropriate transmission. The brake system 26 is configured to provide braking torque to the front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18.

The sensor system 28 includes one or more sensing devices 40a-40n that sense observable conditions of the exterior environment and/or the interior environment of the autonomous vehicle. The sensing devices 40a-40n can include, but are not limited to, radars, lidars, global positioning systems, optical cameras, thermal cameras, ultrasonic sensors, and/or other sensors. The sensing devices 40a-40n obtain measurements or data related to various objects or agents 50 within the vehicle's environment. Such agents 50 can be, but are not limited to, other vehicles, pedestrians, bicycles, motorcycles, etc., as well as nonmoving objects. The sensing devices 40a-40n can also obtain traffic data, such as information regarding traffic signals and signs, etc.

The sensor system 28 further includes internal sensing devices 41 that monitor the various parts of the vehicle. The internal sensing devices 41 can include a camera, digital camera, or Lidar directed at a wheel of the vehicle to obtain information regarding a state of the wheel (i.e., whether or not the wheel is stuck in a ditch). The internal sensing devices 41 can also include speedometers for measuring vehicle speed, accelerometers for measuring vehicle acceleration, torque sensors for measuring a torque at a wheel, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as ventilation, music, lighting, etc. (not numbered).

The controller 34 includes a processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle, and generate control signals to the actuator system 30 to automatically control the components of the autonomous vehicle based on the logic, calculations, methods, and/or algorithms. The instruction may also perform logic, calculations, methods and/or algorithms for operating the vehicle in an automated rocking mode to perform actions for getting the vehicle (or at least one of its wheels) out of a ditch, using the methods disclosed herein.

It is understood that the vehicle 10 does not need to be an autonomous vehicle but can be a vehicle that has a controller for controlling various operations such as measuring parameters of the vehicle, automatically shifting gears based on a state of the vehicle, controlling a throttle, and other operations disclosed herein.

Figure 2:
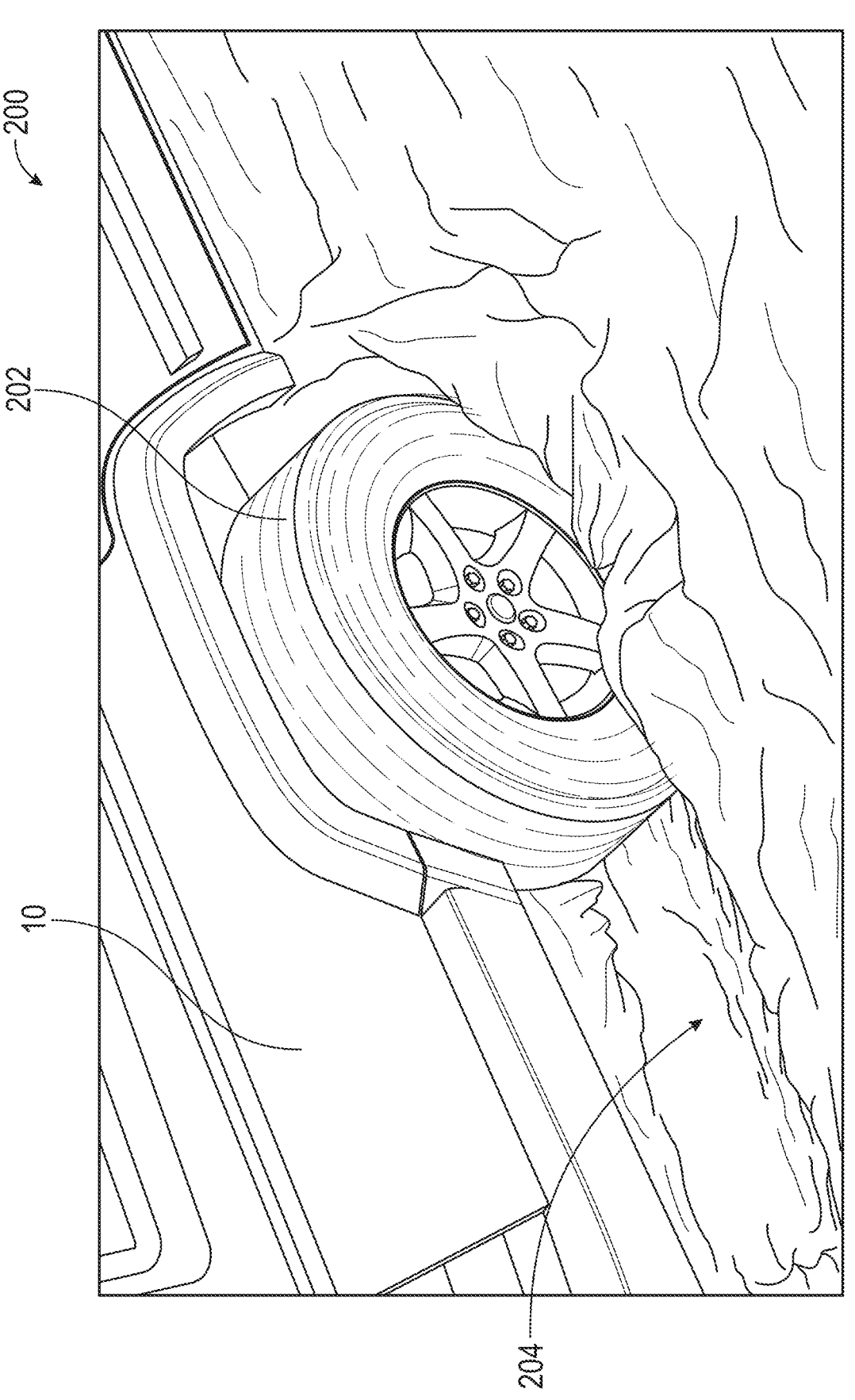
FIG. 2 is a perspective view of a rear end of the vehicle.

FIG. 2 is a perspective view 200 of a rear end of the vehicle 10. The rear right wheel 202 is stuck in a ditch 204. The ditch 204 can be a rut, a hole, a pothole, a pit, divot, depression in the mud, etc. The relative lack of friction between the wheel and the ditch prevents the vehicle from being able to exit the ditch. The presence of mud in the ditch can further reduce the friction between the wheel and the ditch.

Figure 3A:
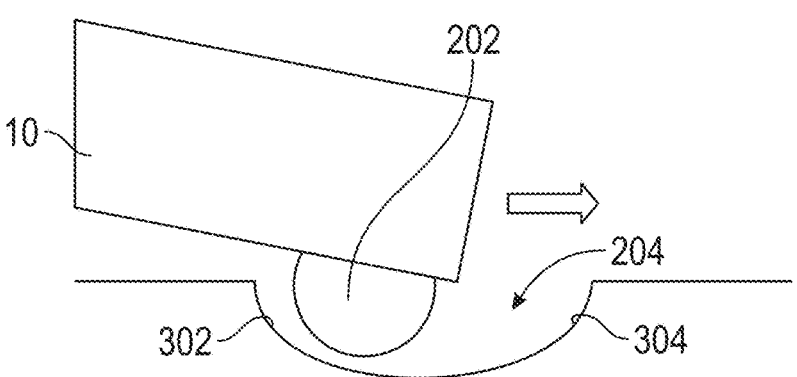
FIG. 3A shows the vehicle in a first position in which the rear right wheel is in the ditch and located at or toward the front surface of the ditch.

FIGS. 3A-3D illustrate a method for exiting a ditch. The ditch 204 has a front surface 302 and a back surface 304. Both surfaces are defined with respect to a direction of forward motion of the vehicle. The front surface 302 and the back surface 304 are both non-horizontal surfaces or inclined surfaces. FIG. 3A shows the vehicle 10 in a first position in which the rear right wheel 202 is in the ditch and located at or toward the front surface 302 of the ditch. As a first action of an automated rocking mode, the vehicle 10 is placed into a reverse gear to rotate the wheel such that the vehicle moves toward the back surface 304 of the ditch.

Figure 3B:
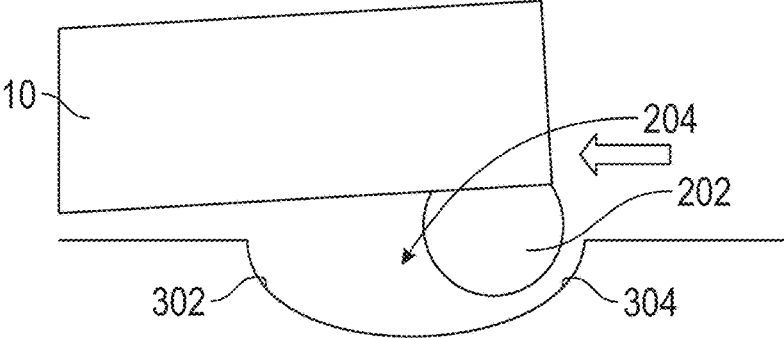
FIG. 3B shows the vehicle in a second position in which the wheel is at the back surface of the ditch.

FIG. 3B shows the vehicle in a second position in which the wheel is at the back surface 304 of the ditch. The vehicle finds itself in the second position as a result of executing the first action when the vehicle 10 was in the first position (FIG. 3A). With the vehicle 10 in the second position and the wheel still stuck in the ditch 204, a second action is taken in which the vehicle is placed into a forward gear to rotate the wheel such that the vehicle moves toward the front surface 302.

Figure 3C:
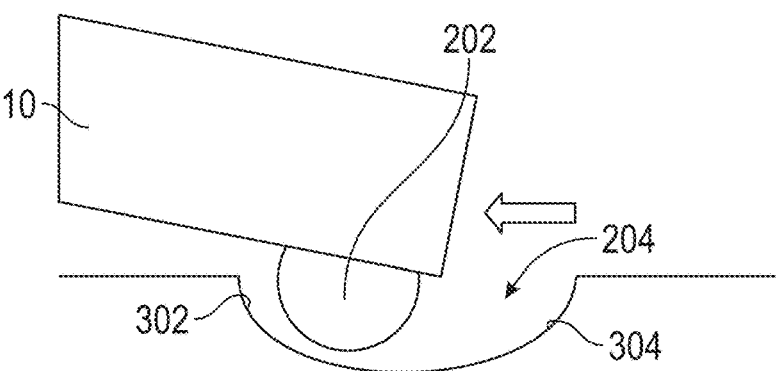
FIG. 3C shows the vehicle having returned to the first position of the ditch from the second position.

FIG. 3C shows the vehicle having returned to the first position of the ditch from the second position. The vehicle finds itself again in the first position as a result of executing the second action when the vehicle was in the second position (FIG. 3B). Upon returning to the first position, the vehicle has an additional forward motion that it did not have when originally in the first position (i.e., FIG. 3A).

Figure 3D:
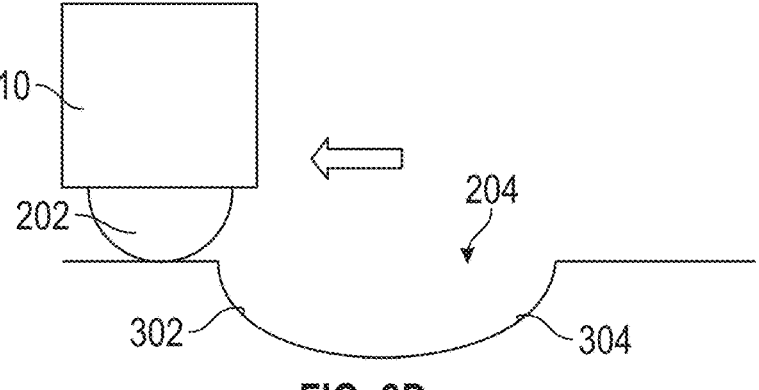
FIG. 3D shows the vehicle having exited the ditch.

FIG. 3D shows the vehicle having exited the ditch. The forward motion that the vehicle had upon returning to the first position allows the vehicle to climb out of the ditch. If the vehicular motion is not enough to allow the vehicle to exit the ditch, the method can be repeated and continued until the vehicle is able to exit through either the front or back of the ditch.

Figure 4:
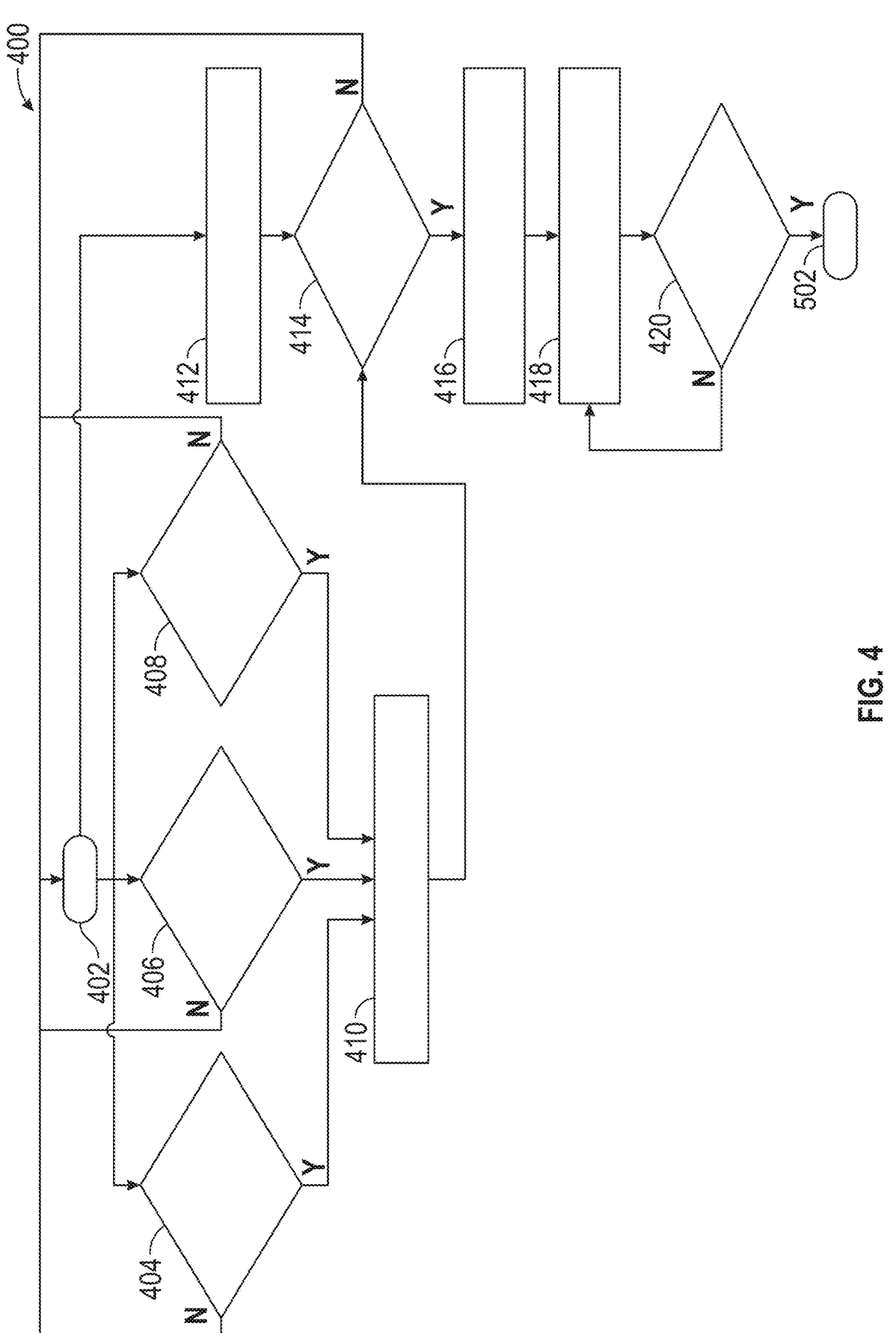
FIG. 4 is a flowchart of a method for entering an automated rocking mode of the vehicle.

FIG. 4 is a flowchart 400 of a method for entering an automated rocking mode of the vehicle. The method begins at box 402. The method includes checking various conditions of the vehicle, as shown in boxes 404, 406, 408 and 412. In box 404, a sensor or sensors (such as an accelerator and/or inertial measurement unit) detect a motion of the vehicle. If it is determined from the motion that the driver is attempting to rock the vehicle, the method proceeds to box 410. In box 410, the customer or driver is prompted to enter the automated rocking mode. From box 410, the method proceeds to box 414. Returning to box 404, if it is determined that there is no attempt to rock the vehicle, the method returns to box 402.

In box 406, a measurement is obtained of wheel slip. If the measurement indicates that wheel slip is occurring for a selected duration of time, the method proceeds to box 410.

In box 410, the customer or driver is prompted to enter the automated rocking mode. From box 410, the method proceeds to box 414. Returning to box 406, if it is determined that there is no wheel slip, the method returns to box 402.

In box 408, an image of the wheel of the vehicle is obtained and reviewed. The image can be a camera image, a Lidar image, etc. If it is determined from the image that the wheel is stuck in the ditch, the method proceeds to box 410. In box 410, the customer or driver is prompted to enter the automated rocking mode. From box 410, the method proceeds to box 414. Returning to box 408, if it is determined from the image that the wheel is not stuck in the ditch, the method returns to box 402.

In box 412, the driver can manually decide to enter the automated rocking mode. From box 412, the method proceeds to box 414. In box 414, the controller checks whether the driver has entered the automated rocking mode. If the driver has not entered the automated rocking mode, the method returns to box 402. Otherwise, the method proceeds to box 416. In box 416, the automated rocking mode is entered. In box 418, the driver is instructed to place the vehicle in neutral with the throttle at wide open throttle or at 100%.

In box 420, the controller checks whether the driver has followed instructions to place the vehicle in the automated rocking mode. If the vehicle is not in neutral the condition "throttle >0%" is not satisfied (or the throttle is not above a selected threshold percentage), the method returns to box 418. Otherwise (i.e., if the vehicle is in neutral with the throttle throttle>0 or above the selected threshold percentage), the method proceeds to box 502 (FIG. 5A).

Figure 5A:
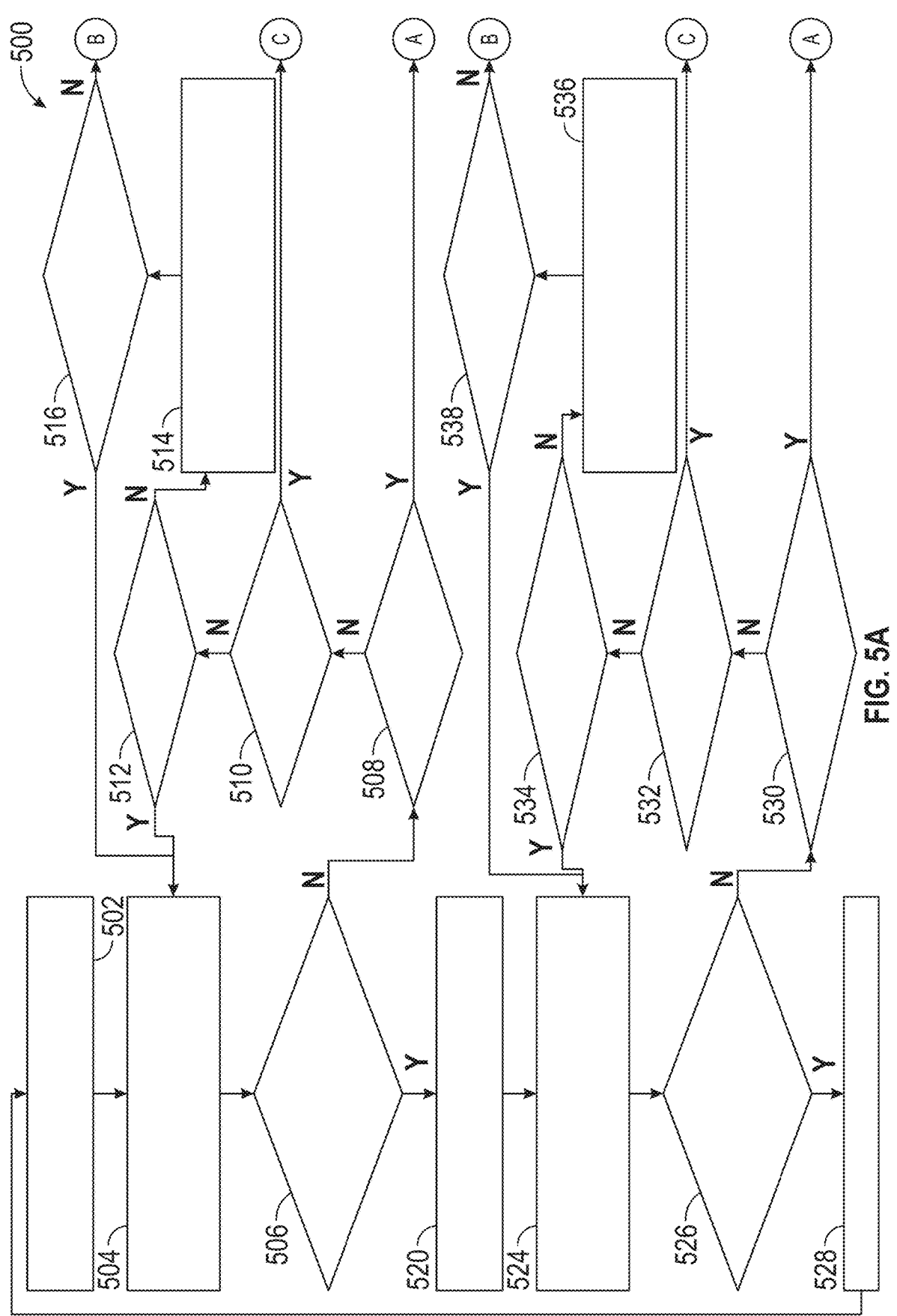
FIGS. 5A and 5B shows a flowchart of a method for operating the vehicle in the automated rocking mode.
Figure 5B:
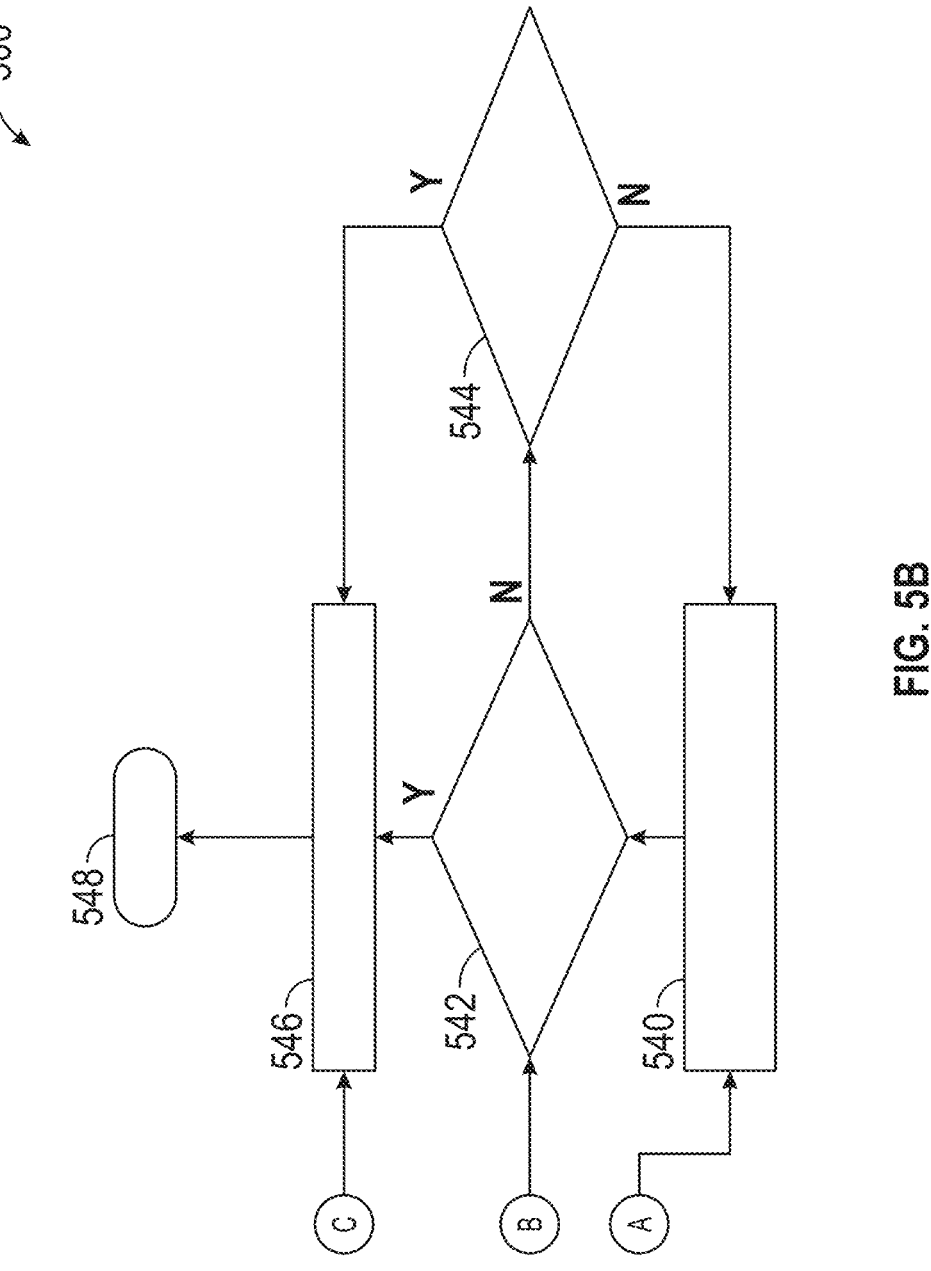

FIGS. 5A and 5B show a flowchart 500 of a method for operating the vehicle in the automated rocking mode. In box 502, the controller places the vehicle into a drive gear (i.e., engages the engine in drive gear). The driver can be alerted of this maneuver using an audible signal, such as a chime, etc. In box 504, the controller ramps up a throttle or acceleration of the vehicle up to a peak target throttle value to move the vehicle in a first direction (forward direction). The peak target throttle value can be a pre-selected value and can be adjusted based on evaluation of power needs, as discussed herein. The rate at which the throttle is ramped up can be based on a current vehicle motion and a current throttle position.

In box 506, the controller performs calculations to determine an effectiveness of the rocking mode with the vehicle in the drive gear. Suitable parameters, such as wheel slip, wheel torque and vehicle acceleration are detected. These parameters are used to determine one or more traction indicators that indicate whether the vehicle is able to gain traction. A traction indicator can be the wheel slip and/or a vehicle motion stall. The wheel slip can be determined by determining a rotation rate of the stuck wheel to a rotation rate of the other wheels. The vehicle motion stall can be a value determined by a ratio of the wheel torque (amount of torque applied to the wheel) to vehicle acceleration (i.e., acceleration of the vehicle). At a constant wheel torque, the ratio increases when the vehicle motion drops. For example, a high vehicle motion stall value occurs when the torque applied to the wheel results in no or little forward acceleration of the vehicle. The traction indicators are compared to traction thresholds to determine the state of the vehicle and thus a subsequent step. For example, if either the wheel slip is greater than a slip threshold or a motion stall is detected (i.e., ratio>stall threshold), the vehicle is considered to no longer be effectively moving forward and the method proceeds to box 520. If, however, the wheel slip is less than the slip threshold and no stall detection (i.e., ratio<=stall threshold), the vehicle is still effectively moving forward and the method proceeds to box 508.

In box 508, the speed of the vehicle is compared to a first threshold speed. The first threshold speed indicates an expected speed for the vehicle once the wheel is out of the ditch. If the speed is greater than the first speed threshold, the vehicle is considered to have successfully exited the ditch and the method proceeds to box 540.

In box 540, the controller acknowledges the vehicle to be unstuck and sends a signal to the driver to suggest that the driver exit the rocking mode by performing an exit sequence. The exit sequence can be pushing a single button or a sequence of pre-existing buttons. The method then proceeds to box 542. In box 542, if the controller receives a signal indicating that the driver has performed the exit sequence, the method proceeds to box 546. Otherwise, the method proceeds to box 544. In box 544, vehicle speed is compared to a second speed threshold. The second speed threshold can be greater than the first speed threshold. The second speed threshold can be a speed that the driver might achieve upon accelerating on a road with traction. If, in box 544, the speed is less than the second speed threshold, the method returns to box 540. However, if, in box 544, the vehicle speed is greater than the second speed threshold, the method proceeds to box 546. In box 546, the rocking mode is exited by the controller. The method then proceeds to box 548 in which the method ends.

Returning to box 508, if the vehicle speed is less than the first speed threshold, the vehicle is considered to still be stuck and the method proceeds to box 510.

In box 510, the controller determines whether the driver has performed an exit sequence. If the driver has performed the exit sequence, the method proceeds to box 546. Otherwise (i.e., the driver has not performed the exit sequence), the method proceeds to box 512. In box 512, the throttle is checked. If the throttle is positive (greater than zero), the method returns to box 504, wherein ramping of the throttle is continued. If, in box 512, the throttle is not zero, the method proceeds to box 514. In box 514, the controller stops applying the throttle and suggests to the driver to apply the throttle in order to stay in the automated rocking mode.

In box 516, the throttle is checked again to see if the driver is still holding the throttle open. If the throttle is less than zero, the method returns to box 504. Otherwise, the method proceeds to box 542.

Turning now to box 520, the controller places the vehicle into a reverse gear (i.e., engages the engine in reverse gear). The driver can be alerted of this maneuver using an audible signal, such as a chime, etc. In box 524, the controller ramps up a throttle or acceleration of the vehicle up to a peak target throttle value to move the vehicle in a second direction (backward direction). The rate at which the throttle is ramped up can be based on a current vehicle motion and a current throttle position.

In box 526, the controller determines the effectiveness of the rocking mode with the vehicle in reverse gear. Wheel slip, wheel torque and vehicle acceleration are detected to determine traction indicators. If either the wheel slip is greater than a slip threshold or motion stall is detected, the method proceeds to box 528. In box 528, the peak target throttle is increased by a selected amount. From box 528, the method returns to box 502. Returning to box 526, if the wheel slip is less than the slip threshold and stall is not detected, the method proceeds to box 530.

In box 530, the speed of the vehicle is compared to the first threshold speed. If the vehicle speed is greater than the first speed threshold, the vehicle is considered to have successfully exited the ditch and the method proceeds to box 540. Otherwise, the method proceeds to box 532.

In box 532, the controller determines if the driver has performed an exit sequence. If the driver has performed the exit sequence, the method proceeds to box 546. However, if the driver has not performed the exit sequence, the method proceeds to box 534. In box 534, the throttle is checked. If the throttle is positive (greater than zero), the method returns to box 524, wherein ramping of the throttle is continued. If, in box 534, the throttle is not zero, the method proceeds to box 536. In box 536, the controller stops applying the throttle and suggests to the driver to apply the throttle in order to stay in the automated rocking mode.

In box 538, the throttle is checked again. If the throttle is less than zero, the method returns to box 524. Otherwise, the method proceeds to box 542.

While the automated rocking mode has been described in a particular order (i.e., the vehicle is first placed in a drive gear and secondly placed in a reverse gear), in other embodiments, the first gear can be the reverse gear and the second gear can be the drive gear.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
    detecting the vehicle to have a wheel stuck in a ditch;
    performing an automated rocking mode at the vehicle, wherein the automated rocking mode comprises:
        engaging, via a processor, an engine of the vehicle into a first gear;

rotating the wheel with the engine in the first gear to create a first motion of the vehicle in a first direction;
        measuring a torque at the wheel and an acceleration of the vehicle with the engine in the first gear;
        determining a traction indicator of the vehicle from a ratio of the torque at the wheel to the acceleration of the vehicle;
        engaging, via the processor, the engine into a second gear when the traction indicator meets a traction threshold; and
        rotating the wheel with the engine in the second gear to create a second motion of the vehicle in a second direction.

2. The method of claim 1, further comprising obtaining the traction indicator with the engine in the second gear and engaging the engine into the first gear to rotate the wheel in the first direction when the traction indicator meets the traction threshold.

3. The method of claim 1, further comprising determining the traction indicator based on a wheel slip of the wheel wherein the traction indicator meets the traction threshold when the wheel slip is greater than a slip threshold.

4. The method of claim 1, further comprising measuring a speed of the vehicle and exiting the automated rocking mode when the speed of the vehicle is greater than a first speed threshold.

5. The method of claim 1, further comprising entering the automated rocking mode when at least one of: (i) an attempt by a driver to rock the vehicle is detected; (ii) a slip is detected at the wheel for a selected duration of time; (iii) a value obtained from an image of the wheel indicates the wheel to be stuck; and (iv) a request to enter the automated rocking mode is received.

6. The method of claim 1, wherein the first gear is a drive gear and the second gear is a reverse gear.

7. The method of claim 1, further comprising ramping up a throttle of the vehicle to a peak throttle value when the engine is in the first gear based on a current throttle position and a current vehicle motion.

8. A system for operating a vehicle, comprising:
    a sensor for detecting the vehicle to have a wheel stuck in a ditch;
    a processor for performing an automated rocking mode at the vehicle, wherein the automated rocking mode:
        engages an engine of the vehicle into a first gear;
        rotates the wheel with the engine in the first gear to create a first motion of the vehicle in a first direction;
        measures a torque at the wheel and an acceleration of the vehicle with the engine in the first gear;
        determines a traction indicator of the vehicle from a ratio of the torque at the wheel to the acceleration of the vehicle;
        engages the engine into a second gear when the traction indicator meets a traction threshold; and
        rotates the wheel with the engine in the second gear to create a second motion of the vehicle in a second direction.

9. The system of claim 8, wherein the processor is further configured to obtain the traction indicator with the engine in the second gear and engage the engine into the first gear to rotate the wheel in the first direction when the traction indicator meets the traction threshold.

10. The system of claim 8, wherein the processor is further configured to determine the traction indicator based on a wheel slip of the wheel, wherein the traction indicator meets the traction threshold when the wheel slip is greater than a slip threshold.

11. The system of claim 8, wherein the processor is further configured to measure a speed of the vehicle and exit the automated rocking mode when the speed of the vehicle is greater than a first speed threshold.

12. The system of claim 8, wherein the processor is further configured to enter the automated rocking mode when at least one of: (i) an attempt by a driver to rock the vehicle is detected; (ii) a slip is detected at the wheel for a selected duration of time; (iii) a value obtained from an image of the wheel indicates the wheel to be stuck; and (iv) a request to enter the automated rocking mode is received.

13. The system of claim 8, wherein the first gear is a drive gear and the second gear is a reverse gear.

14. The system of claim 8, wherein the processor is further configured to ramp up a throttle of the vehicle to a peak throttle value when the engine is in the first gear based on a current throttle position and a current vehicle motion.

15. A vehicle, comprising:

a wheel;

an actuator for controlling rotation of the wheel;

a sensor for detecting a stuck condition for the wheel;

a processor for performing an automated rocking mode at the vehicle, wherein the automated rocking mode comprises:

engages an engine of the vehicle into a first gear;

rotates the wheel via the actuator with the engine in the first gear to create a first motion of the vehicle in a first direction;

measures a torque at the wheel and an acceleration of the vehicle with the engine in the first gear;

determines a traction indicator of the vehicle from a ratio of the torque at the wheel to the acceleration of the vehicle;

engages the engine into a second gear when the traction indicator meets a traction threshold; and rotates the wheel via the actuator with the engine in the second gear to create a second motion of the vehicle in a second direction.

16. The vehicle of claim 15, wherein the processor is further configured to obtain the traction indicator with the engine in the second gear and engage the engine into the first gear to rotate the wheel in the first direction when the traction indicator meets the traction threshold.

17. The vehicle of claim 15, wherein the processor is further configured to determine the traction indicator based on a wheel slip of the wheel, wherein the traction indicator meets the traction threshold when the wheel slip is greater than a slip threshold.

18. The vehicle of claim 15, wherein the processor is further configured to measure a speed of the vehicle and exit the automated rocking mode when the speed of the vehicle is greater than a first speed threshold.

19. The vehicle of claim 15, wherein the processor is further configured to enter the automated rocking mode when at least one of: (i) an attempt by a driver to rock the vehicle is detected; (ii) a slip is detected at the wheel for a selected duration of time; (iii) a value obtained from an image of the wheel indicates the wheel to be stuck; and (iv) a request to enter the automated rocking mode is received.

20. The vehicle of claim 15, wherein the processor is further configured to ramp up a throttle of the vehicle to a peak throttle value when the engine is in the first gear based on a current throttle position and a current vehicle motion.

* * * * *